United States Patent [19]

Schroeder

[11] 4,266,164
[45] May 5, 1981

[54] ELECTROLUMINESCENT BACKING SHEET FOR READING AND WRITING IN THE DARK

[76] Inventor: Becky J. Schroeder, 2317 Valleybrook Dr., Toledo, Ohio 43615

[21] Appl. No.: 20,628

[22] Filed: Mar. 15, 1979

Related U.S. Application Data

[63] Continuation-in-part of Ser. No. 796,896, May 16, 1977, abandoned, which is a continuation-in-part of Ser. No. 639,200, Dec. 9, 1975, Pat. No. 4,024,404, which is a continuation-in-part of Ser. No. 567,397, Apr. 11, 1975, Pat. No. 3,978,340, which is a continuation-in-part of Ser. No. 498,705, Aug. 19, 1974, Pat. No. 3,879,611, which is a continuation-in-part of Ser. No. 428,339, Dec. 23, 1973, Pat. No. 3,832,556, which is a continuation of Ser. No. 288,148, Sep. 11, 1972, abandoned.

[51] Int. Cl.³ ............................................. H05B 33/08
[52] U.S. Cl. .................................. 315/169.1; 40/904; 315/169.3; 362/98
[58] Field of Search ........................... 315/169.1, 169.3; 340/760, 781, 753; 362/34, 84, 97, 98, 99, 27, 29, 31, 801, 812; 40/542, 543, 544, 904; 250/462

[56] References Cited

U.S. PATENT DOCUMENTS

| | | | |
|---|---|---|---|
| 1,673,595 | 6/1928 | Scoggins | 362/98 X |
| 2,632,116 | 3/1953 | Diem | 250/462 X |
| 2,676,818 | 4/1954 | Blumberg | 40/542 X |
| 2,716,298 | 8/1955 | Spielmann et al. | 40/544 |
| 3,037,137 | 5/1962 | Motson | 313/511 X |
| 3,650,824 | 3/1972 | Szepesi et al. | 313/498 X |

FOREIGN PATENT DOCUMENTS 8155   4/1894   Switzerland ............................ 362/98

*Primary Examiner*—Eugene R. La Roche

[57] ABSTRACT

An electroluminescent panel assembly for use in darkness or dim light in which side-by-side light strips form an integrated light field with non-lighted regions between which function as dark guidelines to guide writing on overlying sheets of material through which the integrated luminescent field is visible upon energization of the light strips.

6 Claims, 18 Drawing Figures

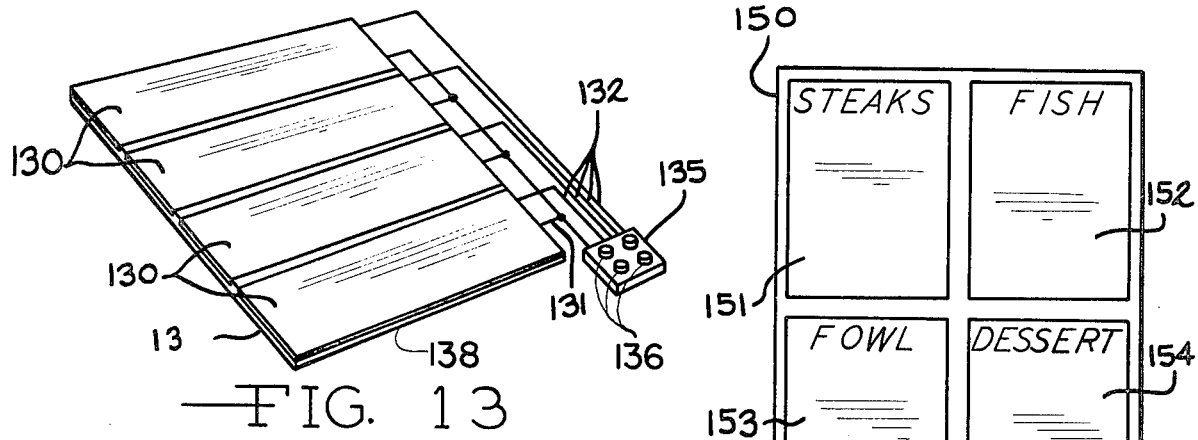
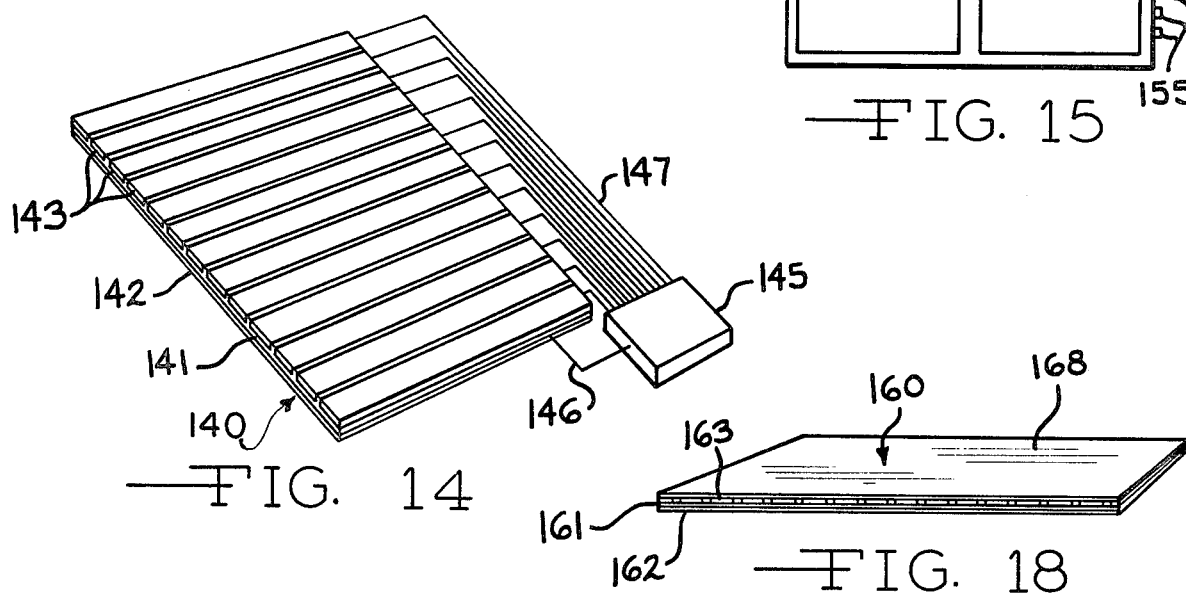
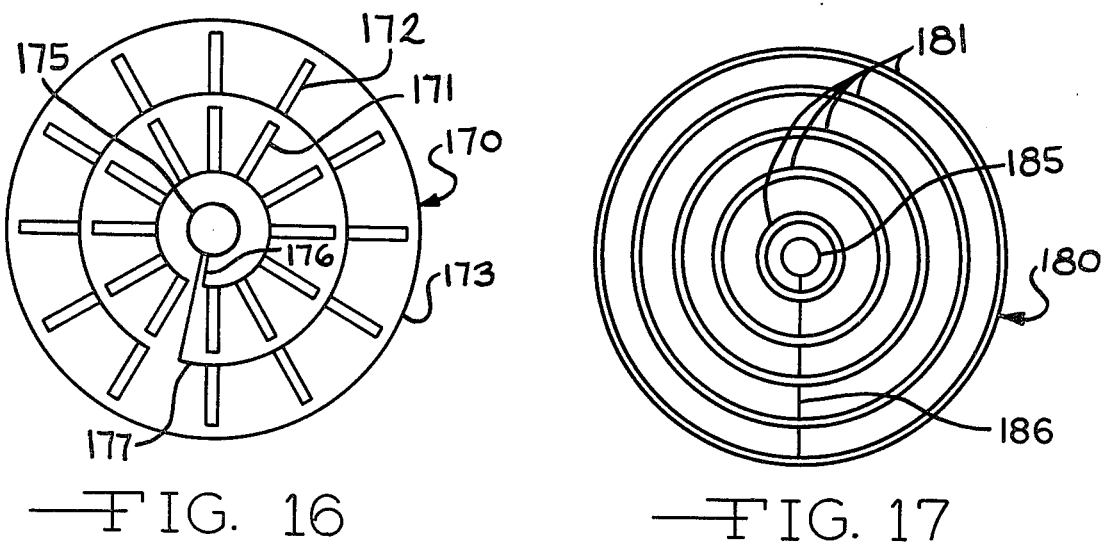

ELECTROLUMINESCENT BACKING SHEET FOR READING AND WRITING IN THE DARK

This is a continuation-in-part of co-pending application Ser. No. 796,896 filed May 16, 1977, abandoned, which is a continuation-in-part of Ser. No. 639,200 filed Dec. 9, 1975, now U.S. Pat. No. 4,024,404, which was a continuation-in-part of application Ser. No. 567,397 filed Apr. 11, 1975 now U.S. Pat. No. 3,978,340, which was a continuation-in-part of Ser. No. 498,705 filed Aug. 19, 1974, U.S. Pat. No. 3,879,611, which was a continuation-in-part of Ser. No. 428,339, filed Dec. 23, 1973, now U.S. Pat. No. 3,832,556, which was a continuation of Ser. No. 288,148, filed Sept. 11, 1972, now abandoned.

This invention relates to an auxiliary or backing sheet for use with writing paper to permit a person to read or to write legibly in the dark with a minimum level of light and a low level of energy consumption.

If one attempts to write in the dark, it has been found that although the mechanics of writing can be accomplished with little more than usual effort, writing in straight lines with uniform spacing between lines and without overlap is difficult in the absence of some guide means. According to the present invention written material can be written in the dark with very little light, and that as little light as given off by a backing sheet having phosphorescent material which is activatable by exposure to light or phosphorescent material which is electrically energized close to its threshold of activation is all that is necessary to enable one to write with a pencil or pen in orderly and neat form in the dark.

A notepad size electroluminescent panel energized by a power source as small as a commercially available penlight cell will provide sufficient backlighting of overlying paper sheets for writing and reading in the dark. According to the invention, since the energy source is small it can be combined directly with the luminescent backing sheet to make it a self-contained portable unit which can be readily inserted under the expanse of a writing sheet. The electrically energized sheet thus can be made into the form of a vest pocket light source or a panel for ready carriage with a writing pad, or incorporated in a clipboard assembly to make it readily accessible for use in the dark.

In this regard, the invention becomes useful in laboratory work where observations are to be conducted in the dark. The invention can be used also in outer space travels where the electrical systems of the spacecraft are required to be shut down for planned periods to permit recharging of equipment. Still further, the invention has practical value in writing in automobiles after dark without the need for internal lighting which has a tendency to distract and disturb the driver.

In view of the foregoing it is an object of the present invention to provide means in the form of a luminescent backing sheet for writing paper which will provide back light in the dark, permitting a writer to write in straight lines without additional light.

Another object of this invention is to provide a portable lightweight, light source for use in reading and writing in the dark.

Still another object of the invention is to provide a portable back lighting or panel which can be easily produced and readily adapted for reading or writing in dimly lit spaces or in total darkness.

Another object of the invention is to provide a light source for reading and writing in the dark which is adaptable to using a minimum of energy for the functional purposes to which it is put.

Still another object is to provide a light output with a minimum size distributive power source to promote minimum size, cost and power consumption.

A still further object of the invention is to provide a portable thin lightweight planar light unit having a self-contained power source and arranged to effect distributive energization of segments in selected patterned relations dependent upon the results sought.

In general, according to the invention, the backing sheet for insertion under the writing paper is a portable electroluminescent sheet having its own power source integral therewith. The electroluminescent sheet lends itself to receipt of guidelines directly thereon or on an overlay sheet, or for some purposes the light intensity may be raised and the guidelines omitted.

The electroluminescent sheet can be made in any of a wide range of sizes and can be made flexible or rigid and of different thicknesses as needs and various uses dictate.

A feature of the invention lies in its low power consumption, and in view of its operability with a small power source at a relatively low voltage it can be made into a simple and safe construction. The portability and low energy consumption of the unit in addition to its thin and capability of flexible construction lend to providing a lighting unit believed to be new in the art.

Other objects and structural features which are believed to be characteristic of the invention are set forth with particularity in the appended claims. My invention, however, both in organization and manner of construction, together with further objects and features thereof may be best understood by reference to the following description taken in connection with the accompanying drawings in which:

FIG. 13 illustrates schematically an electroluminescent panel assembly of the invention in which four electroluminescent cells are aligned side-by-side to form light emitting strips of a light field according to the invention.

FIG. 14 illustrates partly schematically an electroluminescent panel assembly in which a light emitting layer is activated by a single coextensive electrode on one side and a plurality of side-by-side electrodes on the other side which are selectively activatable to energize the entire light field or only portions of the light field as desired.

FIG. 15 shows an arrangement of light emitting regions in a menu wherein each area may be energized independently of others of the assembly.

FIG. 16 illustrates an electroluminescent panel assembly of light strips extending from a central region in an outward direction to form a generally circular configuration of light strips.

FIG. 17 illustrates still another circular electroluminescent panel assembly in which the light strips are of different diameters and arranged concentrically.

FIG. 18 illustrates a side elevational view of an arrangement like that of FIGS. 13 and 14 having a layer of light activatable matter thereover.

Figure 1:
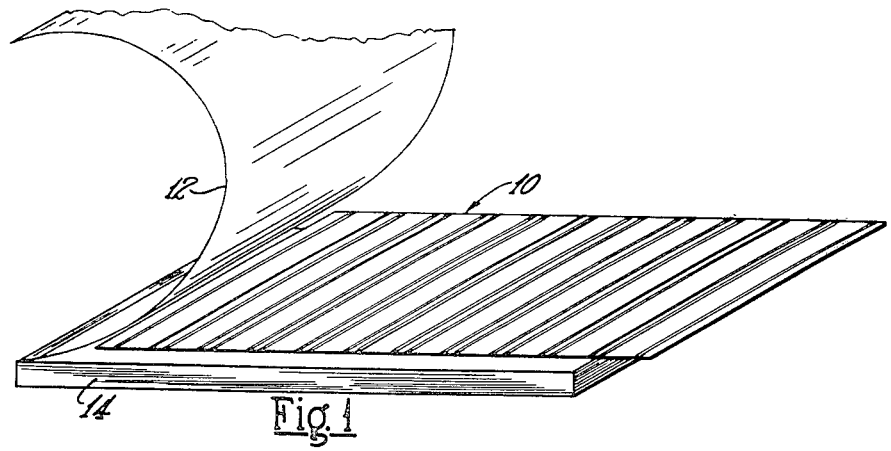
FIG. 1 is a perspective view of a writing tablet with a backing sheet of this invention in partially inserted position under the first paper sheet of the tablet.

Referring to the drawings in greater detail, FIG. 1 illustrates a tablet of writing paper 14 having a top sheet 12 lifted and turned back for insertion of a phosphorescent backing sheet 10 of the invention. As may be seen, the backing sheet can be provided with double lines or extra thick lines if desired.

Figure 2:
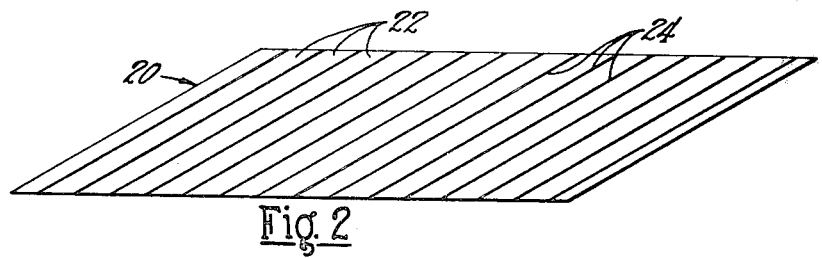
FIG. 2 is a perspective view of a phosphorescent backing sheet of this invention in which the guidelines are nonphosphorescent.

FIG. 2 illustrates a phosphorescent sheet 20 for use with the writing tablet 14 wherein the phosphorescent portions extend over the major portion of the sheet with lines 24 being non-phosphorescent. This sheet can be formed by applying phosphorescent matter in the form of paint or ink over the entire sheet with the non-phosphorescent lines being formed by the absence of phosphorescent material or by an overlay of non-phosphorescent material such as ink or narrow strips of tape. When viewed through the writing paper, written material above the lines is visible against the phosphorescent backing.

Whether or not the writing paper backed by the luminescent sheet of the present invention is lined or unlined, the guidelines enable orderly writing in the dark where ordinarily marked lines are ineffective. Where the writing paper is unlined, sharply marked dark lines on the backing sheet over a phosphorescent base provide guides for orderly handwriting both in the presence of light or in darkness.

Figure 3:
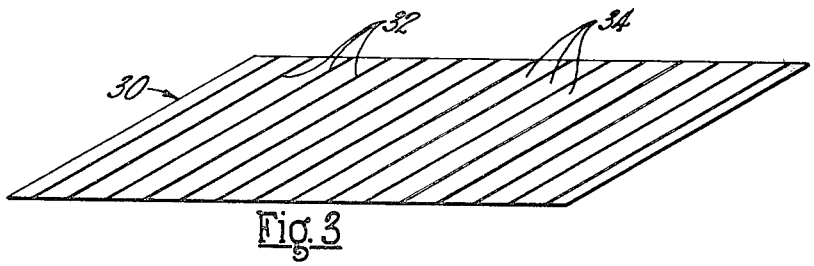
FIG. 3 is a perspective view of another embodiment of the invention in which the guidelines are of phosphorescent material.

FIG. 3 illustrates another embodiment of the invention wherein the backing sheet 30 is provided with parallel phosphorescent lines 32 while the in between portions 34 are non-phosphorescent. This form of the invention has the advantage of needing only a minimum of phosphorescent material and is accordingly inexpensive.

Figure 4:
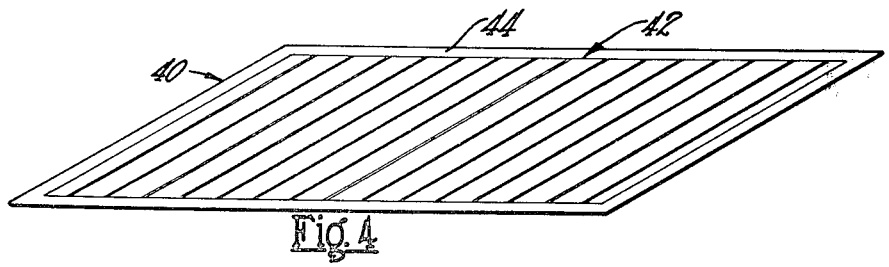
FIG. 4 is a perspective view of another form of the invention in which the phosphorescent portions are embodied in a plastic sheet.

While the phosphorescent backing sheets illustrated in FIGS. 1 to 3 may be any of a number of sheet materials such as ordinary paper, vellum, or even cloth, FIG. 4 is illustrative of a plastic sheet which may be phosphorescent material itself. It might be transluscent or transparent and thermoplastic, enabling encasement of non-phosphorescent line portions, embodied therein. It is perfectly smooth and might be thicker and less flexible than the writing paper itself to facilitate easier writing thereon for greater legibility. The horizontal and marginal lines for the written material might be black or a dark color and non-phosphorescent while the remaining portions of the sheet might be of phosphorescent plastic so that the backing sheet might be utilized either day or night for guidance or handwritten material when the writing paper is placed in overlying relation thereto. That is, by making the guide lines of the plastic sheet contrastingly visible through the writing paper, the sheet can be used for guide purposes under ordinary light as well as in darkness.

The portable luminescent panel of the invention may be an electrically energized panel as well as a light activatable phosphorescent sheet. To activate the light activatable phosphorescent material as a guide for writing in the dark, it is exposed to a light for a period dependent upon intensity of the light. It is found that a sheet of such material requires exposure to ordinary light for a period of only a moment to provide an adequate charge to provide adequate phosphorescence for writing for a period of a quarter of an hour or more.

Figure 5:
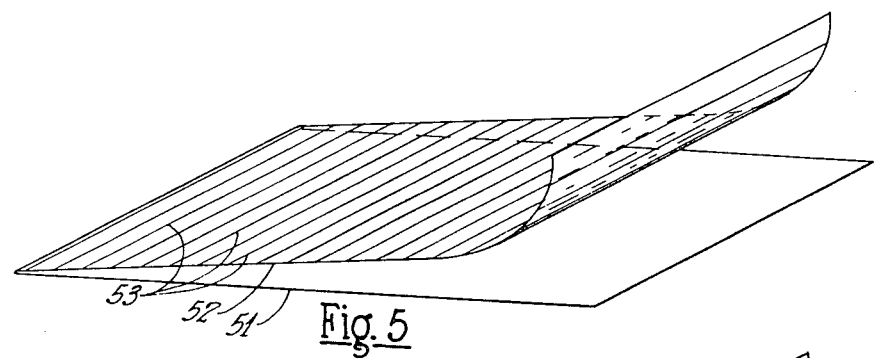
FIG. 5 is a perspective view of still another form of the invention in which guidelines are provided on a transparent sheet assembled with a phosphorescent surfaced backing sheet.
Figure 6:
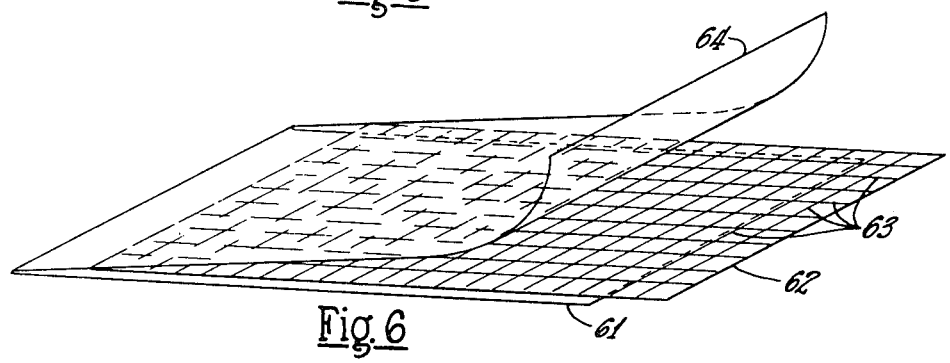
FIG. 6 is a perspective view of another assembly arrangement of the invention in which guidelines are provided on an overlay sheet interposed between a transparent top sheet and a phosphorescent surface member to which it is attached.

In another form of the invention, a luminescent sheet 51 may be assembled as shown in FIG. 5 with a translucent or transparent overlay sheet 52 having relatively opaque guide lines 53 thereon. The assembly can be clipped, adhesively bonded or otherwise suitably secured together with the luminescent sheet, or as shown in FIG. 6 an overlay sheet 62 having guide lines 63 may be held in place between a translucent or transparent top sheet 64 such as of plastic suitably secured along one marginal or edge region of the luminescent sheet 61. This combination provides a flexibility in that the overlay sheet may be replaced with sheets having any number of guide line arrangements for combination with the phosphorescent sheet, while at the same time being readily placed under writing sheets for guiding application of matter thereto in the dark.

In regard to the foregoing reference herein to written material being visible against the phosphorescent backing, it has been found that reading matter can be readily read in complete darkness if the letters of the reading matter have a sufficient body to be silhouetted against the luminescent background. Thus if handwritten matter is written with a thick line, such as with a felt tip pen, or if printed matter is in letters having line thicknesses providing a bold appearance, reading matter can be read readily against a luminescent background both in lighted as well as in dim and dark spaces. The reading matter if on an overlay sheet of light transmitting material, such as a translucent or a transparent sheet can thus be read readily in dark spaces such as in hospital, laboratories or on menus in dimly lit restaurants.

Figure 7:
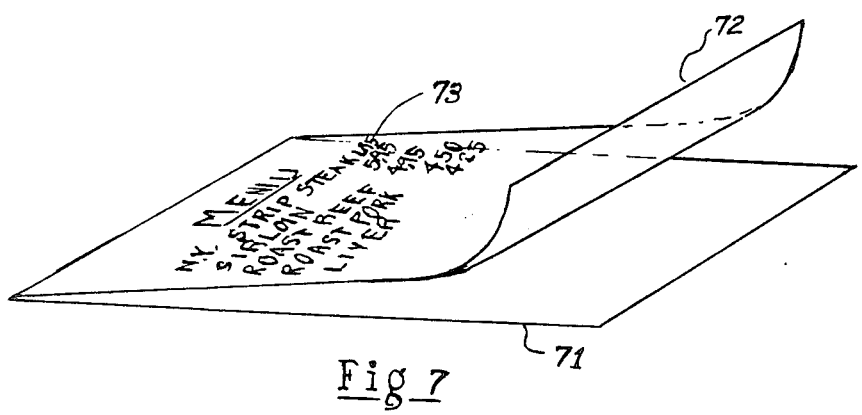
FIG. 7 is a perspective view of still another assembly of the invention in which reading matter is provided on a transparent sheet overlaying a phosphorescent surfaced member.

As illustrated in FIG. 7, the letters 73 of the reading matter on the light transmitting overlay sheet 72 may be of ordinary non-glowing matter in black or in color which will provide a ready contrast against the reflective color of the luminescent backing 71 in lighted spaces. It is well known in physics that light is invisible in space and made visible only when transmitted or reflected from a surface. In this regard, where light is present in a space, the reflective color character of the matter to be read in such light can be selected from the desired contrast against the reflective color of the luminescent background sheet in such light. Colors of the letters can thus be selected for their contrasting visibility in ordinary light but in addition, where the reading matter is to be read in dim light or in darkness, the thickness of the lines of the letters are selected so that they can be seen in silhoutetted form against the luminescent background. In such case the ordinary non-glowing reading matter will appear black against the luminescent background regardless of its color in ordinary light. Letters written with a line thickness greater than from a little under 1/16" width and letters printed in 24 point letter sizes and greater will provide silhouetted forms which can be read quite clearly in darkness against a low light luminescent background as little as one foot lombert or less. In this regard, printing such as for menus it has been found provides satisfactory visibility in the dark when in the range of 24–72 point print.

As an alternate to such letters of reading matter being of non-glowing material, fluorescent material can be utilized for the letters entirely or to outline or to interlineate letters or other intelligible matter.

As still another arrangement for ease of reading or greater clarity in darkness, the intelligible matter can be made with phosphorescent material having a contrasting reflective color in ordinary light against the reflective color of the luminescent backing material. The phosphorescent material of the matter can also be selected for its contrasting luminescent color against the color of the background glow.

The above described arrangement has the feature that when printed reading matter is incorporated in a form such as a menu, a light transmitting overlay on which the reading matter is applied can be readily replaced over the more expensive luminescent backing surface. The luminescent assembly thus can need only use a single luminescent backing surface while the overlay menu sheet can be changed inexpensively with each meal change. The replacement sheets can be readily printed on transparent, translucent or ordinary writing sheets in a conventional duplicating machine. The sheets can be associated with a phosphorescent backing surface in a simple holding assembly. In this regard, the holding assembly might be a luminescent backing provided with an overlying outer transparent face which in a sense forms an envelope within which the printed sheet can be merely slipped for use according to the principles of the present disclosure.

Beside reading material on an overlay sheet thus being visible as set out above, sketches and images and other intelligible matter such as graphs and grids can also be seen more readily according to the principles set out above.

Still further, phosphorescent matter having different rates of decay can be restored to provide the capability of reading and writing in darkness. In this regard fluorescent and phosphorescent materials having different luminescent decay rates can be incorporated into images to form a composite of the overlay and backing sheet to impart apparent motion to the image. Further in this regard two or more phosphorescent colored materials, or two, three or more fluorescent and phosphorescent materials of different decay rates can be incorporated into an image with very unusual visual results.

Intelligible matter can also be applied to an overlay sheet or on the luminescent surface itself with fluorescent matter matched in its activated and reflective color to the color of the luminescent surface. The fluorescent material thus can be made to blend in with the luminescent background and not be visible when activated such as by a light source. It can be made visible as dark silhouetted matter against the luminescent surface, however, by removing it from exposure to the activating source. This principle of invisibility during activation and visibility in darkness when not activated can also be inverted by blending the color of phosphorescent matter in with a fluorescent background during exposure to an activating source and the continuing glow of the phosphorescent material can be made visible in darkness and in contrast to the non-glowing fluorescent material not under the influence of an activating source.

Figure 8:
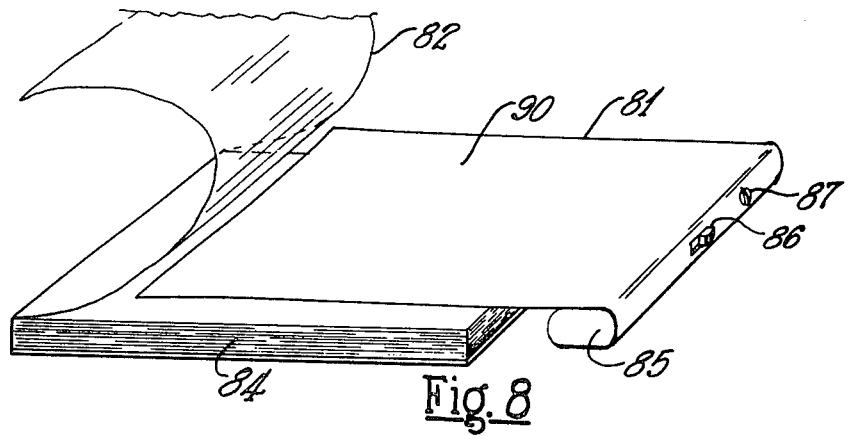
FIG. 8 is a perspective view of a writing tablet with an electroluminescent backing panel of this invention in partially inserted position under the first paper sheet of the tablet.

As shown in FIG. 8 and as described briefly above, the luminescent backing sheet of the invention may be in the form of an electroluminescent sheet or panel 81 having an integral power supply 85 which can be turned on or off at will to provide the light from the light emitting surface 90. The power supply may be placed within a compartment and be of lightweight construction so that the panel can be completely self activated and portable. The panel may be made in various sizes but as shown can be in the form of a thin sheet which can be inserted under the top sheet 82 of a pad of writing paper 84. It can be dimensioned to conform to the area of the writing sheet and can provide as much light as is emitted by the foregoing described light activated phosphorescent sheet or more as desired by provision of a brightness control 87. The panel can be turned on and off at will by an on/off switch 86.

The luminescent sheet can be a phosphorescent sheet which carries a layer of electroluminescent material such as a phosphor like zinc sulfide containing copper or silver added to make it electrically activatable. The layer of luminescent material may be a direct current activatable phosphor material or an alternating or pulsed current phosphor material. In some instances both alternating or pulsed current plus a direct current bias will provide the light output desired.

Since the light output of a electroluminescent panel can be varied such as by varying either the frequency or voltage of the electrical source by way of control such as a voltage control 87, the brightness of the light emitted can be raised to a level such that guide lines may be less needed. Where the light output is dim, however, guidelines can be provided on an overlay sheet as desired over the electro-luminescent sheet.

A unique aspect of the invention is the low level of light which will provide the results desired whereas in the prior art brighter and brighter electroluminescent panels have been sought.

The power supply for the electroluminescent panel 81 can be provided by a commercially available battery, such as a pen-light type dry-cell 88 which activates an inverter circuit 89 to convert the direct current to alternating or pulsed current for activation of the light emitting surface 90. The electroluminescent panels themselves are most frequently constructed with an underlying electrode of conductive material such as a metal plate or a metal foil and an overlying electrode of transparent conductive material between which a phosphorescent material is interposed to be activated by the top and bottom electrodes. The overall assemblage has the properties of a condenser and as such the power consumption for activation of the phosphor layer is small.

For higher voltages, the thickness of the layer of phosphor must be thick enough to withstand the dielectric stress. For the lower voltages of most commercially available batteries, however the thickness of the dielectric phosphor layer according to the present invention can be reduced considerably thereby reducing the weight of the sheet and allowing it to be more flexible as well as reducing the cost of the assemblage. Thus the present invention lends itself to a low cost production of electroluminescent panels and production of light with very little power consumption. In addition, the lightweight construction lends itself to portability and provision of a pocket size source of light for writing as well as reading in the dark.

The power supply may be incorporated in a compartment integral with the electroluminescent sheet base or in a separate compartment attached to the electroluminescent panel or sheet.

Since the voltages involved in activation of the panel are low and safe for handling without special care, the power supply may be made separate and can be arranged to be clipped-on along an edge region of the panel where the panel itself is provided with marginal regions to expose the top and bottom electrodes for clip-on of the power supply.

Figure 9:
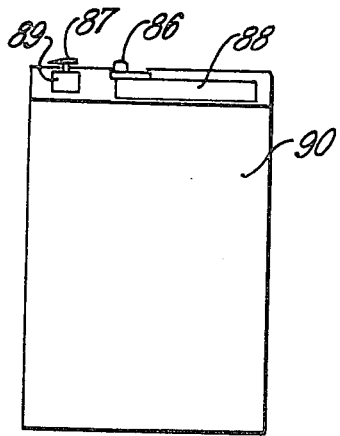
FIG. 9 is a plan view of the backing panel of FIG. 8 showing the location of the battery and associated electric power circuit for activation of the panel.

As shown in FIG. 9, the battery 88 can be a pen-light cell connected to a circuit of small proportions such as a solid-state chip 89 which in turn is connected to the top and bottom electrodes of the panel 81 to activate the light emitting surface 90. The battery and the circuit can be conveniently incorporated in a capsule-like enclosure which ca be located at the edge of the panel or sheet. In view of the convenience of this compartmentalized enclosure for the power source, it lends itself to being made integral with or removeably secured to the panel. If made integral, it can be molded so as to receive the panel in inserted relation for electrical communication with the circuit. if made removeable, the capsule can be arranged to be clipped into place at any of a number of positions along the edge of the sheet where communication with the electrodes is made possible.

The possibility of a relatively low voltage battery operated source allows provision of a lighting sheet which is electrically safe in use and reduces the need for a heavily protected panel and lowers the cost of production. The panel may be made rigid or flexible as desired. It can be made rigid if the base electrode is a metal plate. It can be made flexible if the base electrode is a metal foil. In this regard, the sheet may be made relatively simple in construction with a thin phosphorescent layer disposed between a conductive metal base electrode such as a metal foil and an overlying electrode of transparent conductive material. The thinness of the layer of the electroluminescent material adds to making the sheet flexible which lends itself to being rolled and clipped about the battery or withdrawably placed in a capsule or tube when not in use. In the latter instance, when ready to be used, the flexible sheet can be withdrawn from the capsule to any length desired up to its full length.

Figure 10:
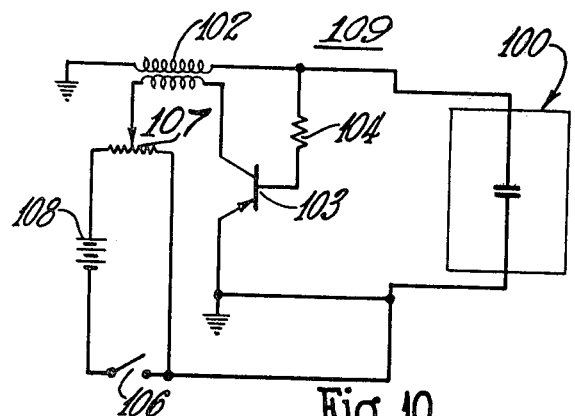
FIG. 10 is a diagramatic illustration of a prior art circuit representative of a battery powered light activating circuit of design which will lend itself to compact, lightweight direct association with an electroluminescent panel according to the invention.

FIG. 10 illustrates a circuit representative of a prior art type of circuit which can be used to activate an electroluminenscent panel according to the invention. The circuit is selected for its capability of compact and lightweight construction as well as its simplicity, ruggedness and low manufacturing cost. In the specific arrangement shown, an oscillator 109 includes a transformer 102, a transistor 103, a fixed resistor 104 and a voltage divider 107. A battery 108 which supplies energy to the circuit upon closure of an on-off switch 106 may be a replaceable commercial dry cell. It also can be a rechargeable battery if desired. The direct-current voltage applied to the circuit is converted by the circuit to an alternating current voltage for activation of the electroluminescent panel 100 represented by a capacitance symbol. Variation of either voltage or frequency of the activating energy will change brightness of light output.

In the circuit of FIG. 10, the voltage divider 107 which enables variation of the activating voltage provides a brightness control for the panel. Alternately, the circuit output to the sheet can be arranged to be varied through a frequency varying control incorporated in the oscillator circuit to permit variation of the light output from the panel. The circuit shown is meant to be only representative since many forms of activating circuits can fulfill the requirements of the invention, including circuits which will provide pulsed energy or alternating energy, or alternating or pulsed energy in combination with a DC biasing voltage, or simple DC energy where the luminescent panel is direct-current activatable.

Figure 11:
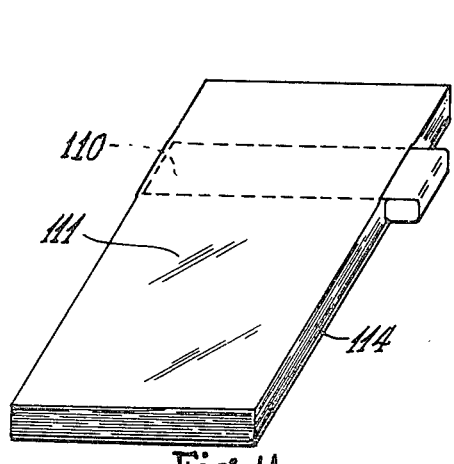
FIG. 11 is a perspective view of an electroluminescent sheet of smaller size than the writing sheet with which it is used illustrating how a small portable pocket size panel with its own power source can be used for backlighting of larger size writing sheets.

FIG. 11 illustrates an electroluminescent panel of the invention which is smaller than the size of the paper on which matter is to be written in the dark. In this arrangement the panel 110 is made generally as long as the width of the writing field of the sheet of paper and has width dimension which will provide a luminescent field sufficient for writing in the dark. As the portion of the paper overlying the panel is filled with written material, the panel can be moved progressively downward to light unused portions of the sheet. In this way a sheet or writing paper 111 of a size such as a pad 114 can be adequately lit with very little light for writing in the dark and with very little consumption of power. The panel can be made of size to fit the pocket and can be used conveniently with a pocket notebook as well. In addition, such a panel can be used for other lighting purposes in the dark, such as lighting the keyhole of a lock when no other source of light is available.

Figure 12:
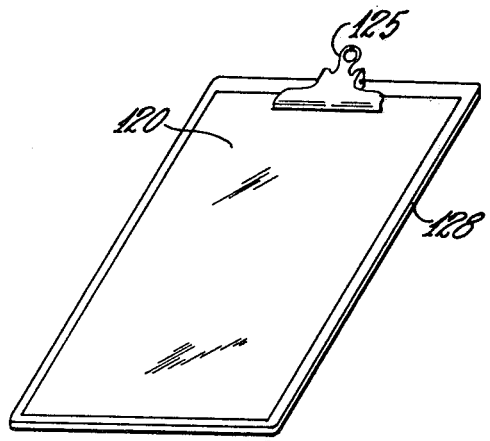
FIG. 12 illustrates an electroluminescent panel of the invention wherein the battery source is integrated in extended relation over the back of the panel.

FIG. 12 illustrates another form of the invention in which the battery 128 is of planar shape underlying the electroluminescent panel 120. The thin planar battery may form a permanent base for the electroluminescent panel and when its effective energy is completely used, the unit may be thrown away. Preferably, however, the batter 128 is arranged to be replacable with another battery. In such an arrangement the electroluminescent panel 120 might be made in the form of a clipboard wit a clip 125 for holding writing paper on which written material is to be applied in the dark. This form of the invention has particular usefulness in hospitals where a patient's records are to be filled in at night by a nurse at the patient's bedside.

In another arrangement of the invention, a light activated sheet can be provided on the back side of the light emitting panel. Thus both a light activatable and an electrically activated luminescent side of the panel can be provided for use in the dark.

Additionally, a thin light-activatable sheet or layer can be provided in overlying relation with the light emitting surface of an electroluminescent panel. The light activatable layer can be made sufficiently thin that light given off therefrom can be both seen as well as activated from the front and back sides of the layer. The electroluminescent light output can thus pass through the light activated layer to permit use of the energized panel while at the same time causing the light activatable layer to become activated so that upon shut-off of the electrical energy, the glow of the light activated layer can continue for use in writing and reading in the dark. In this way, the available energy can be conserved. In addition, the electrical circuit can be arranged to effect an intermittent energization and de-energization of the electroluminescent panel at a frequency to provide a sustained light output from the combination of light emitting layers for continuous use at desired light output levels. The capacitance of the panel itself might be used as a component of the circuit effecting such energization.

Further in this regard, the electroluminescent material of the electrically activated panel can be provided with a more sustained output or an appreciable persistence such that the frequency and periodicity of activation can be selected for low level power consumption at a desired light output level.

FIG. 13 illustrates four electroluminescent cells 130 which form strips lined in side-by-side relation and mounted on a base 138 of suitable rigid material such as chipboard to provide a light field made up of the four cells 130. Each of the cells is energized by way of a pair of conductors, a conductor 131 common to each cell and a conductor 132, which are connected to a power source 135 having individual switches 136 illustrated schematically associated therewith for selective energization of any one or more of the cells or all of them simultaneously to cause light to be emitted from selected portions of the light field or the entire light field. Although only four are shown in the panel assembly illustrated, it will be recognized that any number of light cells can be utilized. The spaces between the light cells provide dark regions which can act as guidelines such as for writing paper placed over the assembly for writing purposes.

Such an assembly can be arranged with wider or narrower light strips to conform to predetermined pattern. In this regard the assembly can be arranged as in FIG. 15 to provide backlighting for a menu 150 with different light cells each arranged to permit selective reading of a portion of the menu. For example, chop type items of a steak section 151 as illustrated might be lit by one cell while the seafood section 152 can be lit by another and both of the remaining sectons 153 and 154 can be lit selectively to permit separate reading of the and dessert sections or all simultaneously as desired by actuation of the associated respective pushbuttons 155.

FIG. 14 illustrates another arrangement of the invention in which electrically activatable light emitting matter of a lighting unit 140 is sandwiched between a coextensive electrode 142 and a plurality of independently and selectively activatable electrodes 143 on the opposite side. As illustrated, the electrodes 143 are transparent electrodes such as a tin oxide layer while the opposite electrode 142 may be of aluminum. Where use indicates a greater desirability of inverting this arrangement, however, the plurality of electrodes on one side of the activatable material may be opaque such as aluminum strips while the opposite side electrode common to the entire light of the electrically activatable material 141 may be a layer of tin oxide. Each of the electrode strips 143 is connected to a separate conductor 147 while the common electrode 141 is connected to a conductor 146. Both conductors 146 and 147 are connected to a power source 145 which energizes by switch selection any one or more of the electrodes 143 to permit energization of a portion of the light field or the entire light field as desired. The spaces between the electrodes 143 can be made to any width desired and in not being energized can be of size to provide dark regions between the light emitting regions which can be utilized as guidelines for writing in the dark when writing paper is placed over the light emitting field.

The circuitry of the power source 145 can be provided with a switching circuit of conventional clock type arranged to effect a progressive sequential energization of the light strips of the assembly. The frequency of energization of the strips can be at a slow rate for a visible effect of progression, or at a more rapid rate to produce the effect of a coherent light output from the entire light field or selected portions of the light field. Thus the power consumption for the total area lighted can be made small relative to a constant energization of the area since only one segment of the total field is energized each instant. Thus a power source only as large as is required to light a segment of the field is necessary and this can be switched electrically among the remaining segments of the lighted portion of the field at a rate sufficient that the normal eye persistence of an observer will cause an impression of a constant light output.

By way of example, if the frequency of energization is 600 hertz and 10 segments of a field are to be lighted, the power source can be switched to energize each segment at a rate of 30 times a second for a period of two hertz per energization which is quite adequate due to human eye persistence to provide the effect of a steady light output.

The light output can be imparted an appearance of greater stability by providing a thin layer or sheet of light activatable light emitting phosphorescent matter over the light field of a lighting unit of the type shown in FIG. 4. Such an arrangement is illustrated in FIG. 18 wherein a layer of light activatable phosphorescent matter 168 is placed over the light emitting surface of an electroluminescent lighting unit 160. The layer 168 is activated by the electroluminescent light emitted by the unit which is also visible through the layer 168. Thus a more persistent light output is produced by a combination of light activatable light and the light of electrically activated phosphorescent matter which is visible at the surface of the unit 160. The electrically activated light emitting matter 161 is energized between electrodes 163 and a common electrode 162 and the entire combination can be sealed against moisture between layers of polytetrafluoroethylene not shown. Thus a steadier and more persistent light output can be provided from the unit by reason of the slower light energy release or greater persistence of the overlying light activatable matter energized by the electrically energized light emitting matter.

Alternately, the electrically activated light emitting matter 161 can be provided in the form of a layer of microencapsulated particles in which the particles or small particle clumps are individually sealed against moisture in a light transmissive moisture resistant sheath such as a resinous film like a polyester also transmissive to the light activating electrical energy for production of emitted light. The overlying layer of light activatable phosphorescent matter 168 placed over the light activatable matter can similarly be provided in the form of microencapsulated particles sealed in individual sheaths of moisture resistant light transmissive material. The overlying layer also can be of fluorescent material activated by the light of the electrically activated light emitting matter. The fluorescent matter can be on a light transmissive carrier film and can be selected to emit light of a different color from light emitted by the electrically activated light emitting matter, for example, red activated by green light.

As still another arrangement, microencapsulated light activatable phosphorescent particles can be intermixed or interlayered in light exposed relation to the microencapsulated particles of electrically activatable light emitting matter to provide a greater light persistence than is obtainable from the electrically activatable matter alone. Similarly the color of light emitted by the phosphorescent matter may be different from that of the light radiated by the electrically activated light emitting matter. Fluorescent particles alone or in combination with microencapsulated phosphorescent particles can also be intermixed or interlayered in light exposed relation to the microencapsulated electrically activated light emitting particles, each material being arranged to emit the same or different colored light.

In another arrangement, two or more different microencapsulated electrically activatable light emitting phosphors selected to produce different colored light outputs at different voltages or frequencies can be intermixed and interposed between overlying conductive electrodes, one or both of which are light transmissive.

FIGS. 16 and 17 illustrate additional arrangements of electroluminescent segments for flexible adapatability to other use. FIG. 16 shows an arrangement of longitudinal light strips 171 and 172 aligned end to end on a base 173 of a lighting unit 170. An arrangement such as is illustrated lends itself to assemblage as a clock with analog appearing indication on a clock face. The lighting strips 171 and 172 are activated digitally by a power and timer circuit 175 located centrally of the array connected to the lighting strips by connecting leads 176 and 177 schematically illustrated.

To further illustrate the wide range of application the lighting strips can be oriented in a concentric circle array 180 as shown in FIG. 17 wherein the light field is made up of circular lighting strips 181 which are energized by a power switching circuit 185 located centrally and connected to the strips by way of conductors of a cable 186. Although circular light strips are here shown it will be recognized that any shape such as square ellipses or any of a wide variety of shapes might be used in an array extending about a central region or an off center region. The strips 181 can be lit simultaneously or in sequence from the outside to the center or vice versa at different rates for any of a wide range of visual decorative effects. This arrangement as well as that of FIG. 16 also lend themselves to many game possibilities.

Although the light emitting substance is referred to herein as "phosphorescent material", it will be understood that the invention may utilize any of a number of substances which will glow or emit light and accordingly the terminology "phosphorescent material", as used herein is meant to include chemiluminescent, bioluminescent, and solid state materials including any substance which will emit light without an apparent rise in temperature after exposure to a stimulus such as heat, light, or electric current, voltage, electric discharge and electrical signals.

In view of the foregoing it will be understood that many variations of the arrangement of the invention can be provided within the broad scope of principles embodied therein. Thus, while particular preferred embodiments of the invention have been shown and described, it is intended by the appended claims to cover all such modifications which fall within the true spirit and scope of the invention.

I claim:

1. An electroluminescent panel assembly for writing in darkness comprising a plurality of independently activatable electrically energizable light emitting phosphorescent strips aligned in side-by-side relation to form an integrated luminescent field and a power source connected for energization of each of said light strips, said strips each being arranged to provide a segment of said luminescent field spaced a small distance from the segment of light field of an adjacent strip in said integrated field forming a series of narrow non-lighted regions therebetween which function as dark guidelines for an overlying sheet of material through which said luminescent field is visible upon energization of said strips, said panel assembly being a self-contained portable unit incorporating its own power source.

2. An electroluminescent panel assembly according to claim 1 wherein the narrow non-lighted regions between strips are parallel and equidistantly spaced an amount for guidance of successive lines of written matter.

3. An electroluminescent panel assembly according to claim 1 wherein switching means is provided within said panel assembly for energization of selected ones of said light strips.

4. An electroluminescent panel assembly for reading of written matter on an overlying sheet comprising a plurality of independently activatable electrically energizable light emitting segments of an overall luminescent field, a power source connected for energization of each of said light segments and switch means for selective energization of any one or more of said light segments to permit selective illumination of areas of said luminescent field and an overlying sheet of material through which said luminescent field is visible upon energization of said segments, said panel assembly being a self-contained portable unit.

5. An electroluminescent panel unit according to claim 4 which is a self-contained portable unit and adapted to use as a menu in which different light segments are arranged to illuminate different items on said menu.

6. An electroluminescent panel assembly according to claim 4 in which means is provided for selective energization of a portion of the total group of segments of the light field and enlargement of the number of the group of light segments illuminating an area of the light field of the assembly.

* * * * *